UNITED STATES PATENT OFFICE 2,561,807

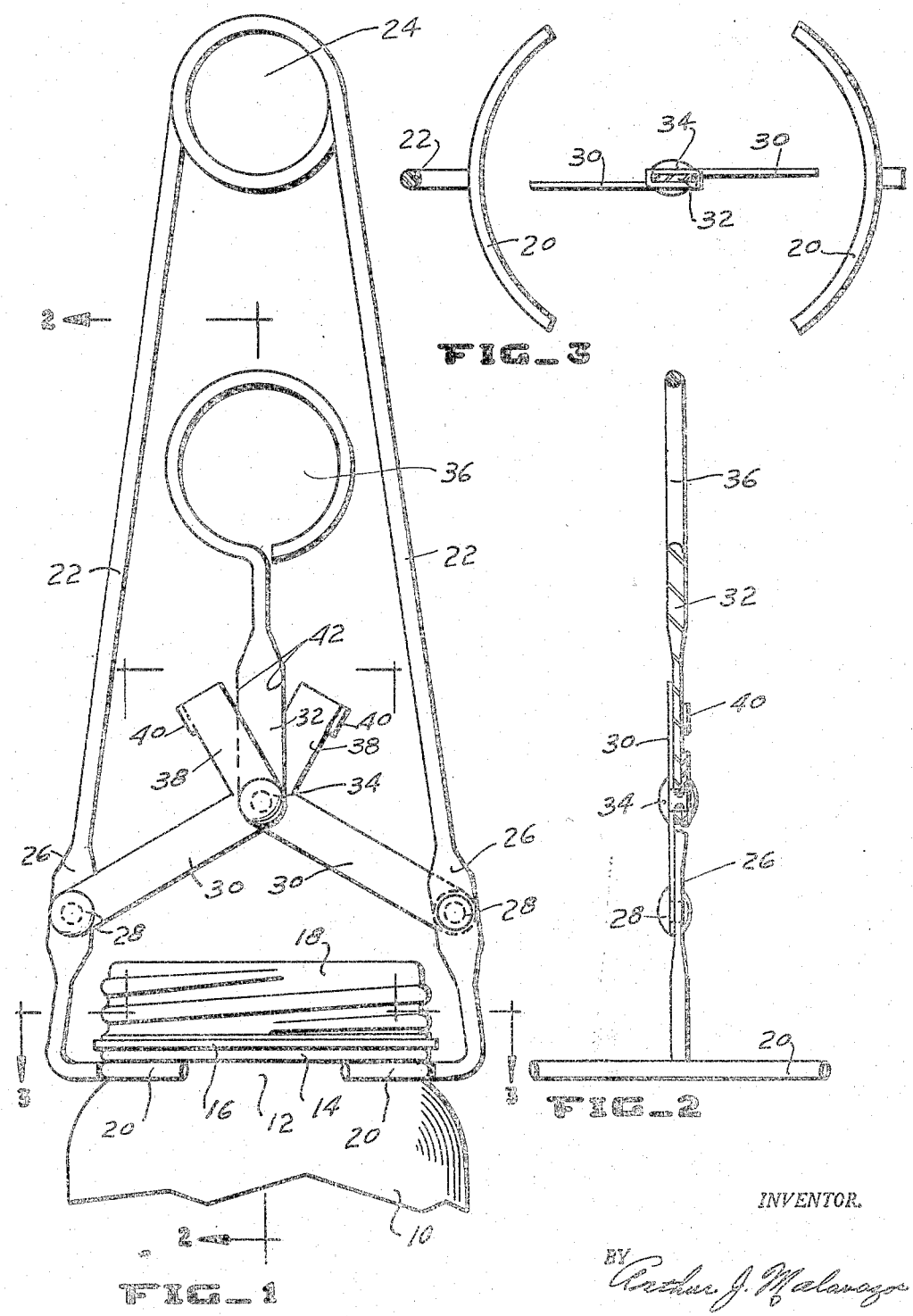

JAR LIFTER

Arthur J. Malavazos, Oakland, Calif.

Application April 27, 1948, Serial No. 23,480

3 Claims. (Cl. 294—33)

This invention relates to a device for lifting fruit jars or similar objects from boiling water during canning operations so as to eliminate the danger of burning or scalding the hands.

It is, therefore, an object of this invention to provide a new and improved jar lifter especially designed for engaging the neck portion of a fruit jar in a secure and positive manner so as to enable the jar to be safely removed from a vessel containing boiling water.

Another object of this invention is to provide a jar lifter which may be operated by the thumb and fingers of one hand in a convenient and simple manner and at the same time to enable a positive grip action on the jar to which the lifter is applied.

A further object of the invention is to provide a jar lifter having a toggle action for closing the jaws of the lifter about the neck of the jar with means provided for maintaining the toggle operating bar in a centralized position when the jaws are in their open position to thereby facilitate the use of the lifter.

Another object is to provide a lifter of the type hereinbefore described which is simple and rugged in construction and inexpensive to manufacture.

With these and other objects in view, the invention consists of certain novel features of construction to be hereinafter shown and described in connection with the accompanying drawings in which:

Figure 1 is a side elevation of the jar lifter as applied to the neck of a fruit jar.

Figure 2 is a cross-sectional view taken along the line 2—2 in Figure 1.

Figure 3 is a cross-sectional view of the lifter taken along the line 3—3 in Figure 1.

As shown in Figure 1 of the drawing, a jar lifter incorporating my improved form of design is applied to a fruit jar 10 of conventional style having a neck portion 12 at the upper end thereof which is surmounted by a sealing lip 14 against which is forced a rubber sealing gasket 16 by a screw-type of lid 18. The jar lifter is provided with substantially semi-circular jaws 20 which are adapted to engage the neck portion 12 of the fruit jar beneath the lip 14, the jaws being forced firmly into engagement with the jar at that point so as to enable the same to be safely removed from the boiling water in which it is immersed. The jaws 20 are secured by welding or other suitable means to the lower ends of arms 22 which constitute the ends of a torsion spring formed of resilient wire or similar material and coiled to form a loop 24. The arms 22 are, therefore, yieldably urged apart by means of the action of the torsion spring and hence the jaws 20 are normally urged to their open or inoperative position.

Near their lower ends the arms 22 are flattened as at 26 where they are perforated so as to accommodate rivets 28 which serve to pivotally connect the outer ends of a pair of toggle links 30 thereto. The links 30 are pivotally connected to one another at their inner ends and also to a toggle operating bar 32 by means of a rivet 34. The bar 32 is formed with an eye 36 at its upper end so as to provide a finger grip by means of which the bar may be operated. Each of the toggle links 30 is also provided with an extension 38 situated at right angles to the main body of each of the links 30, and each extension is provided with a bentover ear or projection 40 which is adapted to engage against the sides 42 of the bar 32 and thereby cause the latter to be held in an upright or centralized position when the toggle links 30 are in their straightened position and the jaws 20 are open.

The operation of the device is as follows:

The jar lifter is manipulated by the use of the thumb and preferably the first two fingers of one hand of the user. The thumb is placed in the loop 24 of the torsion spring while the first two fingers are placed through the eye of the bar 32, the jaws 20 of the lifter being held open and the toggle links 30 being maintained in their straightened position at that time due to the effect of the torsion spring which tends to move the arms 22 away from one another. The toggle operating bar 32 is held in its upright position by means of projections 40 bearing against either side of the bar so that the eye 36 is held in position to be conveniently engaged by the fingers of the user when the thumb is placed in the loop 24. The jaws 20 are then placed about the neck of the jar 10 which is to be lifted and the thumb and fingers are squeezed together so as to pull the bar 32 upwardly, thereby breaking the toggle formed by the links 30 and pulling the arms 22 and the jaws 20 together against the action of the torsion spring. Due to the mechanical advantage of the toggle linkage a very tight grip may be obtained on the neck of the jar by the jaws 20 with very little effort on the part of the user, and the jar may be safely removed from the boiling water without any danger of the jar slipping from between the jaws 20.

Having thus described my invention in connection with one preferred embodiment thereof what I claim as new and desire to secure by Letters Patent is:

1. A jar lifter comprising a pair of jar engaging jaws, spring means for resiliently urging said jaws to be moved apart, a pair of links pivotally connected to said jaws and to one another so as to form a toggle therebetween, a toggle operating bar pivotally connected to the center of the toggle formed by said links for breaking the toggle and closing the jaws, and means for maintaining said bar in a centralized position with respect to the toggle links when the toggle is straightened and the jaws are opened including a projection on each of said links for engaging said bar on opposite sides thereof when the toggle is straightened to thereby hold said bar in its centralized position.

2. A jar lifter device comprising a spring formed of resilient wire and including a loop and a pair of diverging arms, a jar engaging jaw secured to the end of each of said arms, a pair of links pivotally connected to said arms and also to one another so as to form a toggle joint between said arms, a toggle operating bar pivotally connected to the center of the toggle formed by said links, said bar being provided with an eye and said spring loop and said eye being disposed adjacent to one another so as to enable the loop and the eye to be moved toward one another by the thumb and fingers of one hand of the user, and a centralizing arm on each of said links extending substantially perpendicularly to the axis of the link in a plane common to the two links and adapted to maintain said toggle operating bar in a centralized position with respect to the toggle links when the toggle is straightened and the jaws are open to thereby facilitate the gripping of said loop and said eye by the thumb and fingers on one hand of the user.

3. In combination with a jar lifter including a pair of diverging arms, resilient means urging said arms apart, and jar engaging jaws at the end of said arms: a toggle mechanism comprising a pair of links pivotally connected to one another and to said arms, and a toggle operating bar pivotally connected to the center of the toggle formed by said links, and a centralizing arm on each of said links extending substantially perpendicularly to the axis of the link in a plane common to the two links, and located adjacent the pivotal connection between the two links, said arms being adapted to contact the toggle operating bar when the links are in one extreme position.

ARTHUR J. MALAVAZOS.

REFERENCES CITED

The following references are of record in the file of this patent:

UNITED STATES PATENTS

| Number | Name | Date |
| --- | --- | --- |
| 305,653 | Anthony | Sept. 23, 1884 |
| 496,158 | Henkle | April 25, 1893 |
| 1,359,649 | Allison | Nov. 23, 1920 |
| 1,682,373 | Davis | Aug. 28, 1928 |
| 2,186,030 | Lester | Jan. 9, 1940 |